US012466018B2

(12) United States Patent
Oho et al.

(10) Patent No.: US 12,466,018 B2
(45) Date of Patent: Nov. 11, 2025

(54) MACHINE TOOL CONTROL DEVICE

(71) Applicant: FANUC CORPORATION, Yamanashi (JP)

(72) Inventors: Yusaku Oho, Yamanashi (JP); Naoto Sonoda, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 633 days.

(21) Appl. No.: 17/758,827

(22) PCT Filed: Jan. 25, 2021

(86) PCT No.: PCT/JP2021/002379
§ 371 (c)(1),
(2) Date: Jul. 14, 2022

(87) PCT Pub. No.: WO2021/153483
PCT Pub. Date: Aug. 5, 2021

(65) Prior Publication Data
US 2023/0043796 A1 Feb. 9, 2023

(30) Foreign Application Priority Data

Jan. 28, 2020 (JP) ................. 2020-011403

(51) Int. Cl.
*B23Q 15/12* (2006.01)
*B23B 47/34* (2006.01)
*B23Q 15/013* (2006.01)
*B23Q 17/09* (2006.01)
*G05B 19/4093* (2006.01)

(52) U.S. Cl.
CPC .............. *B23Q 15/12* (2013.01); *B23B 47/34* (2013.01); *B23Q 15/013* (2013.01);
(Continued)

(58) Field of Classification Search
CPC ...... B23B 47/34; B23Q 15/013; B23Q 15/12; B23Q 17/0952; G05B 19/4093; G05B 2219/45129; Y10T 408/173; Y10T 408/23
See application file for complete search history.

(56) References Cited

U.S. PATENT DOCUMENTS 10,353,374 B2 * 7/2019 Sonoda ............ G05B 19/40938
10,434,614 B2 * 10/2019 Sonoda ................ B23Q 15/013
(Continued)

FOREIGN PATENT DOCUMENTS

CN 201079836 Y 7/2008
CN 101347846 A 1/2009
(Continued)

OTHER PUBLICATIONS

International Search Report issued in PCT/JP2021/002379; mailed Apr. 6, 2021.

*Primary Examiner* — Eric A. Gates
(74) *Attorney, Agent, or Firm* — Studebaker Brackett PLLC

(57) ABSTRACT

A machine tool control device which reliably divides and discharges chips, and which suppresses damage to a tool by reducing shock when the tool cuts into a workpiece. The machine tool control device causes the tool to rotate and executes a cutting process to move the tool and the workpiece while causing the same to oscillate relative to one another in a feed direction, and is provided with an oscillation command generating unit which generates an oscillation command on the basis of a predetermined oscillation condition. A position and speed control unit controls a motor by superimposing the oscillation command generated by the oscillation command generating unit onto a position command or a position deviation. The oscillation command generating unit changes an oscillation command phase progression method and/or an oscillation command amplitude (Continued)

on the basis of an oscillation phase calculated from on a predetermined oscillation condition, or based on time.

4 Claims, 8 Drawing Sheets

(52) U.S. Cl.
CPC ..... *B23Q 17/0952* (2013.01); *G05B 19/4093* (2013.01); *G05B 2219/45129* (2013.01); *Y10T 408/173* (2015.01); *Y10T 408/23* (2015.01)

(56) References Cited

U.S. PATENT DOCUMENTS

| | | | |
|---|---|---|---|
| 10,471,563 | B2 * | 11/2019 | Sonoda ................ B23Q 15/013 |
| 2018/0281139 | A1 * | 10/2018 | Yamamoto .............. B23B 13/08 |
| 2018/0297164 | A1 | 10/2018 | Sonoda et al. |
| 2018/0307196 | A1 * | 10/2018 | Oho ....................... B23Q 15/12 |

FOREIGN PATENT DOCUMENTS

| | | | | |
|---|---|---|---|---|
| CN | 107234255 | A | | 10/2017 |
| CN | 110695762 | A | | 1/2020 |
| DE | 112014007112 | T5 | * | 7/2017 ......... G05B 19/4093 |
| DE | 102018002957 | A1 | * | 10/2018 ........... B23Q 15/013 |
| DE | 112019007578 | T5 | * | 5/2022 ......... G05B 19/4093 |
| EP | 2420351 | A1 | * | 2/2012 ............. B23Q 15/12 |
| JP | 2005-144580 | A | | 6/2005 |
| JP | 2011-248473 | A | | 12/2011 |
| JP | 2013-240837 | A | | 12/2013 |
| JP | 5631467 | B1 | | 11/2014 |
| JP | 2018-126863 | A | | 8/2018 |
| WO | 2015/162739 | A1 | | 10/2015 |
| WO | 2016/031897 | A1 | | 3/2016 |
| WO | 2017/051705 | A1 | | 3/2017 |

* cited by examiner

MACHINE TOOL CONTROL DEVICE

TECHNICAL FIELD

The present disclosure relates to a machine tool control device.

BACKGROUND ART

Conventionally, hole-cutting processes using a drill as a cutting tool (hereinafter referred to as a tool) are known. In a non-step process where hole cutting takes place in one pass, among the hole-cutting processes, it is known that a drill is easily entangled with chips and a processed hole is easily clogged with chips. Therefore, measures have been proposed to break up and discharge chips by step feeding and pecking (return action). In this case, however, a large shock may occur when a tool cuts into a workpiece, damaging the blade edge.

To deal with such an issue, such a technology is known in which a tool is vibrated at a low frequency with respect to a feed direction to cut into a workpiece (for example, see Patent Documents 1 to 3). According to the technologies, it is said that it is possible to execute a cutting process while breaking up chips that occur during the cutting process, improving processing accuracy, workability, and tool life.

In Patent Document 1 described above, however, although it has been described that a feed rate of a position command is changed, reductions in shock during cutting-in have not yet been taken into account. Similarly, in Patent Document 2, although it has been described that a speed is changed between a forward action and a backward action through oscillation, the forward action and the backward action are merely switched at a predetermined main axis angle, and again reductions in shock during cutting-in have not yet been taken into account.

In Patent Document 3, on the other hand, it has been described that a feed rate is increased and decreased within a range that a tool does not move backward. It is said that there are shock reduction effects during cutting-in. However, since the tool does not move backward, it is difficult to discharge chips, and the tool may be entangled with the chips, resulting in abnormal processing.

Patent Document 1: PCT International Publication No. WO2015-162739
Patent Document 2: Japanese Unexamined Patent Application, Publication No. 2018-126863
Patent Document 3: Japanese Patent No. 5631467

DISCLOSURE OF THE INVENTION

Problems to be Solved by the Invention

Therefore, what is desired is to provide a machine tool control device that makes it possible to reliably break up and discharge chips, and to suppress damage to a tool by reducing shock when the tool cuts into a workpiece.

Means for Solving the Problems

An aspect of the present disclosure is a machine tool control device configured to execute a cutting process by controlling a main axis configured to cause a cutting tool to rotate relative to a workpiece and controlling a feed axis configured to cause the cutting tool to move and oscillate with respect to a feed direction relative to the workpiece. The machine tool control device includes an oscillation command generating unit configured to generate an oscillation command causing the cutting tool to oscillate with respect to the feed direction relative to the workpiece, based on a predetermined oscillation condition, and a control unit configured to control an electric motor configured to drive the feed axis, based on a superimposed command generated by superimposing the oscillation command generated by the oscillation command generating unit onto a position command or a position error representing a difference between the position command and position feedback. The oscillation command generating unit changes at least one selected from a method of advancing a phase of the oscillation command and an amplitude of the oscillation command, based on either an oscillation phase calculated based on the predetermined oscillation condition, or time.

Effects of the Invention

According to the present disclosure, it is possible to provide a machine tool control device that makes it possible to reliably break up and discharge chips, and to suppress damage to a tool by reducing shock when the tool cuts into a workpiece.

BRIEF DESCRIPTION OF THE DRAWINGS

FIG. 9 is a view illustrating a superimposed command making it possible to reduce shock during cutting-in;

FIG. 10 is a view illustrating a superimposed command making it impossible to reduce shock during cutting-in;

PREFERRED MODE FOR CARRYING OUT THE INVENTION

An embodiment of the present disclosure will now be described herein in detail with reference to the accompanying drawings.

Figure 1:
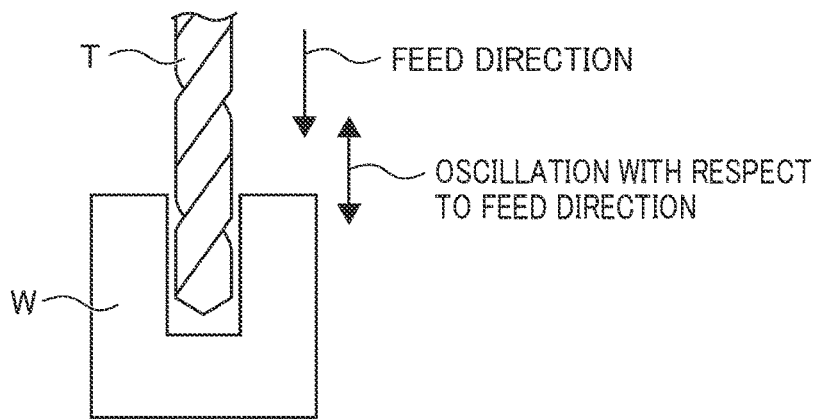
FIG. 1 is a view illustrating a drilling process according to an embodiment of the present disclosure.

FIG. 1 is a view illustrating a drilling process according to the embodiment of the present disclosure. As illustrated in FIG. 1, the drilling process according to the present embodiment is one in which a drill is used as a tool T to perform a hole-cutting process on a workpiece W. More specifically, the drilling process according to the present embodiment is one in which the tool T is caused to rotate relative to the workpiece W, and the tool T is caused to oscillate with respect to a feed direction relative to the workpiece W to perform the hole-cutting process, making it possible to break up chips. An example will now be described below where the workpiece W is fixed, and the tool T is rotated by a main axis and is moved by a feed axis for performing the process.

Figure 2:
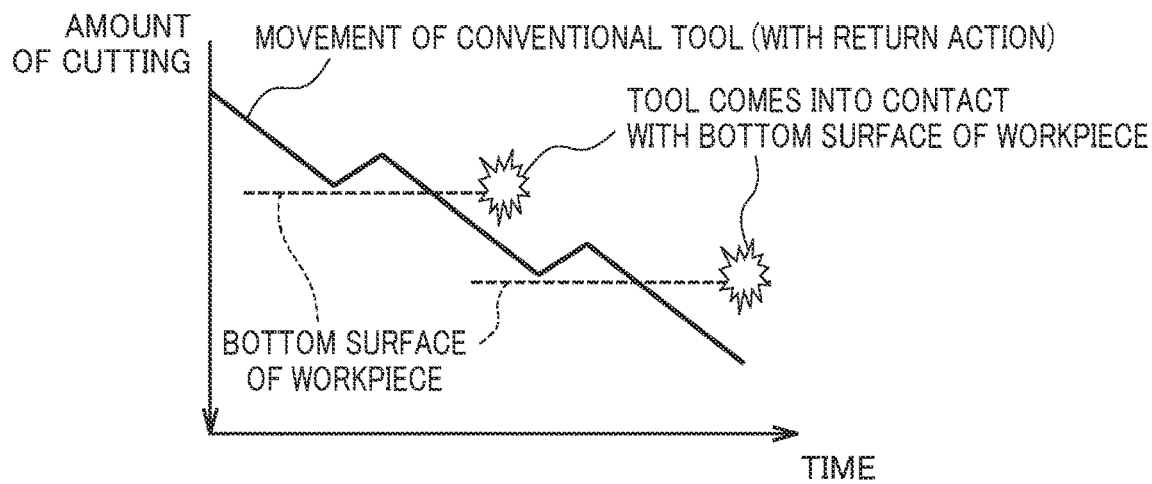
FIG. 2 is a view illustrating how a tool moves in a conventional drilling process.

Note herein that FIG. 2 is a view illustrating how a tool moves in a conventional drilling process. As illustrated in FIG. 2, in the conventional drilling process with return actions, the return actions with respect to the feed direction each cause the tool T to once move in a direction away from a bottom surface of a hole being processed (hereinafter referred to as a bottom surface of the workpiece). At this time, chips are broken up. Next, cutting-in actions each cause the tool T to move once again in a direction closer to the workpiece W, and then to come into contact with the bottom surface of the workpiece, restarting cutting. At this time, a shock occurs as the tool T comes into contact with the bottom surface of the workpiece. Conventionally, since reduction of this shock has not yet been taken into account, and, as illustrated in FIG. 2, a speed (inclination) of the tool is constant, a large shock occurs.

Figure 3:
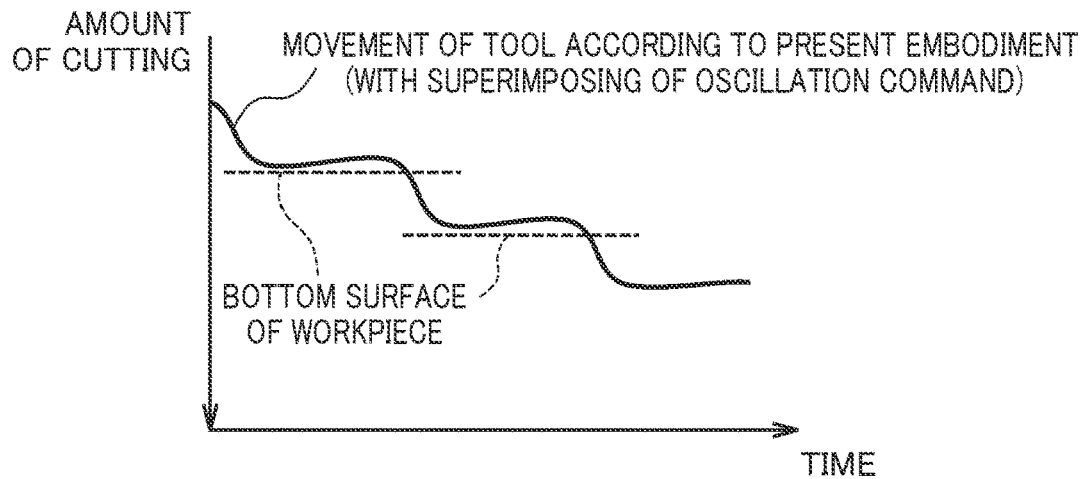
FIG. 3 is a view illustrating how a tool moves in the drilling process according to the embodiment of the present disclosure.

On the other hand, FIG. 3 is a view illustrating how the tool T moves in the drilling process according to the present embodiment. As illustrated in FIG. 3, in the drilling process according to the present embodiment, the tool T moves in accordance with a superimposed command generated by adding (hereinafter referred to as superimposing) a sinusoidal-oscillation command to a position command, as will be described later in detail. Specifically, since the tool T is caused to oscillate with respect to the feed direction, a reverse action with respect to the feed direction (hereinafter also referred to as a backward action) causes the tool T to once move in the direction away from the bottom surface of the workpiece. At this time, chips are broken up. Next, an advance action in the feed direction (hereinafter also referred to as a forward action) causes the tool T to once again come into contact with the bottom surface of the workpiece, restarting cutting. At this time, in the drilling process according to the present embodiment, since a sinusoidal-oscillation phase and/or a sinusoidal-oscillation amplitude are/is changed between the forward action and the backward action, as will be described later in detail, it is possible to change the speed (inclination) of the tool, as illustrated in FIG. 3. Therefore, it is also possible to reduce the speed of the tool during cutting-in, making it possible to reduce shock during the cutting-in.

Next, a configuration of a machine tool control device configured to execute the drilling process according to the present embodiment will now be described herein in detail with reference to FIG. 4. A machine tool control device 100 according to the present embodiment is configured to execute the drilling process by controlling a motor (not shown) for a main axis configured to cause the tool T to rotate relative to the workpiece W and controlling a motor 30 for a feed axis configured to cause the tool T to move and oscillate with respect to the feed direction relative to the workpiece W. The machine tool control device 100 according to the present embodiment is achieved by causing a computer including a central processing unit (CPU) and a memory, for example, to read a program used for executing the drilling process according to the present embodiment.

Figure 4:
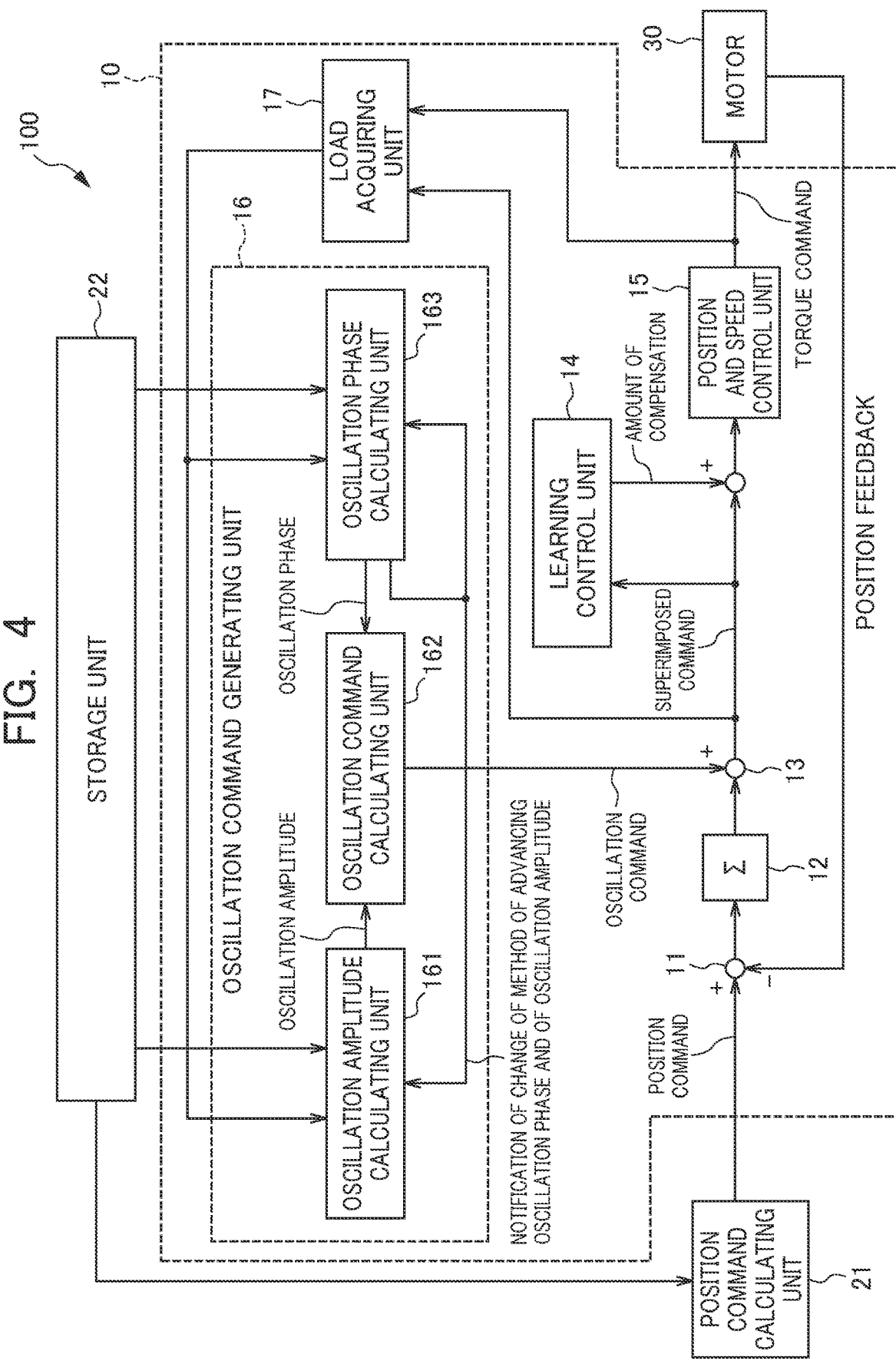
FIG. 4 is an operational block diagram of a machine tool control device according to the embodiment of the present disclosure.

FIG. 4 is an operational block diagram of the machine tool control device 100 according to the present embodiment. As illustrated in FIG. 4, the machine tool control device 100 according to the present embodiment includes a position command calculating unit 21, a storage unit 22, a servo controller 10, adders 11, 13, an integrator 12, a learning control unit 14, a position and speed control unit 15, an oscillation command generating unit 16, and a load acquiring unit 17.

The position command calculating unit 21 is configured to calculate a position command. Specifically, the position command calculating unit 21 calculates a position command for the motor 30 for the feed axis by analyzing a processing program stored in the storage unit 22, described later.

The adder 11 is configured to calculate a position error. Specifically, the adder 11 calculates a position error representing a difference between position feedback based on a position detected by an encoder (not shown) provided to the motor 30 for the feed axis and a position command for the feed axis, which is calculated by the position command calculating unit 21 described above.

The integrator 12 is configured to calculate an integrated value of the position error. Specifically, the integrator 12 calculates an integrated value of the position error by integrating the position error calculated by the adder 11 described above.

The adder 13 is configured to calculate a superimposed command. Specifically, the adder 13 generates a superimposed command by adding (superimposing) an oscillation command generated by the oscillation command generating unit 16 described later to the integrated value of the position error, which is calculated by the integrator 12 described above. A method of generating a superimposed command will be described later in detail.

The learning control unit 14 is configured to compensate the superimposed command by calculating an amount of compensation for the superimposed command based on the position error described above and adding the calculated amount of compensation to the superimposed command. More specifically, the learning control unit 14 repeatedly calculates a cyclic amount of compensation based on a cyclic superimposed command. Specifically, the learning control unit 14 includes a memory, stores an error between an ideal position of the motor 30 that is able to define a cycle and an actual position in the memory, reads the error stored per cycle in the memory, calculates an amount of compensation, which makes the error closer to 0, and superimposes the calculated amount of compensation onto the superimposed command for compensation. With a superimposed command according to the present embodiment, which contains an oscillation command that may easily lead to a position error, and with a compensation by the learning control unit 14, there is an improvement in the ability of following a cyclic oscillation command.

Furthermore, it is preferable that the learning control unit 14 stores a superimposed command and a phase of an oscillation command in an associated manner in the memory, and calculates an amount of compensation for the superimposed command based on a correspondence relationship between the stored superimposed command and the stored phase of the oscillation command. Thereby, there is a further improvement in the ability of following a cyclic oscillation command.

The position and speed control unit 15 is configured to control the motor 30 by generating a torque command for the motor 30 driving the feed axis, based on the superimposed command after compensated as described above and using the generated torque command. Thereby, while oscillating and driving the feed axis, the position of the motor 30 reaches a command position.

The oscillation command generating unit 16 is configured to generate an oscillation command causing the tool T to oscillate with respect to the feed direction relative to the workpiece W, based on a predetermined oscillation condition. As illustrated in FIG. 4, the oscillation command generating unit 16 includes an oscillation phase calculating unit 163, an oscillation amplitude calculating unit 161, and an oscillation command calculating unit 162. The oscillation phase calculating unit 163 is configured to calculate an oscillation phase by calculating a reference phase based on the predetermined oscillation condition (not shown) and multiplying a time or the reference phase with a rate of change based on the predetermined oscillation condition. The oscillation amplitude calculating unit 161 is configured to calculate an oscillation amplitude based on the predetermined oscillation condition. The oscillation command calculating unit 162 is configured to calculate an oscillation command based on the oscillation phase calculated by the oscillation phase calculating unit 163 and the oscillation amplitude calculated by the oscillation amplitude calculating unit 161. Note herein that the predetermined oscillation condition includes oscillation phase information and oscillation amplitude information, which are acquirable from the processing program stored in the storage unit 22, described later, time, and a rotation number of the tool T that rotates relative to the workpiece W. The oscillation command generating unit 16 generates an oscillation command based on the oscillation phase information and the oscillation amplitude information.

It is preferable that the oscillation phase calculating unit 163 changes a rate of change in the oscillation phase calculated based on the predetermined oscillation condition to reduce a processing load on the tool T, which is acquired by the load acquiring unit 17 described later. Similarly, it is preferable that the oscillation amplitude calculating unit 161 changes the oscillation amplitude calculated based on the predetermined oscillation condition to reduce a processing load on the tool T, which is acquired by the load acquiring unit 17 described later. Thereby, it is possible to change the oscillation phase and the oscillation amplitude in accordance with an increase or a decrease in processing load, making it possible to reduce shock during cutting-in.

One of the features of the present embodiment is that the oscillation command generating unit 16 changes at least one selected from a method of advancing a phase of an oscillation command and an amplitude of the oscillation command, based on either time, or a reference phase calculated based on the predetermined oscillation condition. Note herein that a change of a method of advancing a phase of an oscillation command at least includes a change of a rate of change in oscillation phase, and may include a change of oscillation amplitude. By changing a method of advancing a phase of an oscillation command and an amplitude of an oscillation command, it is possible to reduce shock during cutting-in. This will be described later in detail.

Furthermore, it is preferable that the oscillation command generating unit 16 changes at least one selected from a method of advancing a phase of an oscillation command and an amplitude of an oscillation command based on tool information. The tool information is stored in the storage unit 22 described later. The tool information includes specifications of the tool T, including the number of blades of the tool T and the diameter of the tool T, for example. For example, when a ratio of a processing depth with respect to a tool diameter is equal to or greater than a predetermined value, increasing a rate of change in oscillation phase makes it possible to improve ease of discharging chips. Furthermore, for example, the greater the number of blades of the tool T, the easier it is for the trajectories of the blades to overlap with each other, making it possible to easily achieve non-actual cutting (air cutting). Even by increasing a rate of change in oscillation phase and reducing an oscillation amplitude, it is therefore possible to break up chips. The relationship between the number of blades of the tool T and an oscillation command will be described later in detail.

Furthermore, it is preferable that the oscillation command generating unit 16 causes a phase of an oscillation command to be synchronized with a phase of the main axis causing the tool T to rotate relative to the workpiece W. For example, the greater the number of blades of the tool T, the narrower the gap between the blades, sacrificing ease of discharging chips. However, allowing a phase of an oscillation command to be synchronized with a phase of the main axis makes it possible to improve ease of discharging chips. The synchronization between a phase of an oscillation command and a phase of the main axis will be described later in detail.

The storage unit 22 is configured to store information including tool information regarding the tool T (specifications of the tool T, including the number of blades of the tool T and the diameter of the tool T, for example), a processing program, oscillation phase information (for example, rate of change in oscillation phase) and oscillation amplitude information (for example, magnification of oscillation amplitude), which are acquirable from the processing program, time, the rotation number of the tool T that rotates relative to the workpiece W (the rotation number of the main axis), for example.

The load acquiring unit 17 is configured to acquire a processing load exerted on the tool T during a cutting process. Specifically, the load acquiring unit 17 acquires a processing load that the tool T receives during the cutting process, from a superimposed command or a current value of and a torque command to the motor 30.

Figure 5:
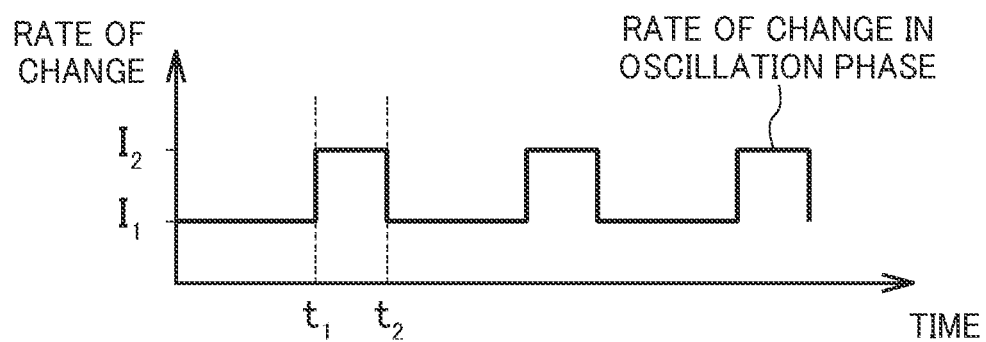
FIG. 5 is a view illustrating a rate of change in oscillation phase in the drilling process according to the embodiment of the present disclosure.
Figure 6:
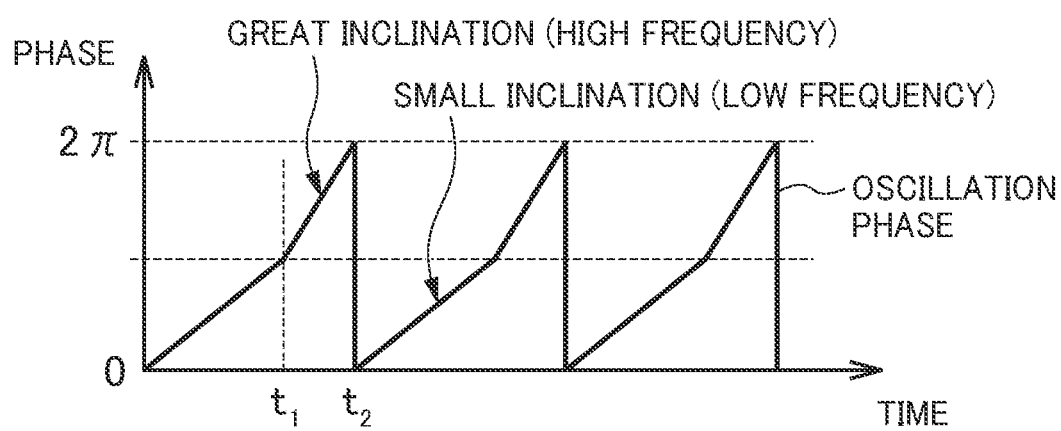
FIG. 6 is a view illustrating an oscillation phase in the drilling process according to the embodiment of the present disclosure.
Figure 7:
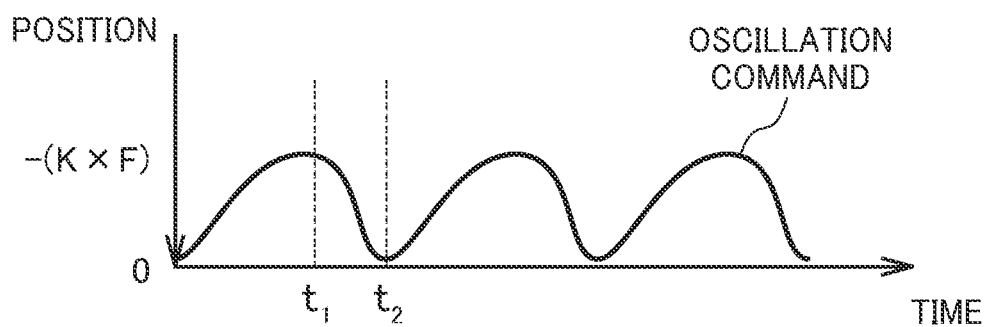
FIG. 7 is a view illustrating an oscillation command in the drilling process according to the embodiment of the present disclosure.
Figure 8:
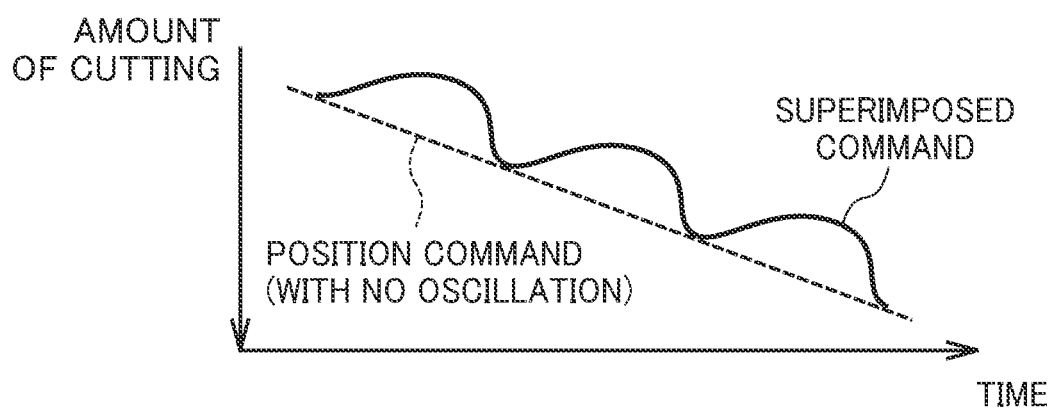
FIG. 8 is a view illustrating a superimposed command in the drilling process according to the embodiment of the present disclosure.

Next, a method of generating a superimposed command according to the present embodiment when a method of advancing a phase of an oscillation command is changed based on time will now be described herein in detail with reference to FIGS. 5 to 8. Note herein that FIG. 5 is a view illustrating a rate of change in oscillation phase in the drilling process according to the present embodiment. FIG. 6 is a view illustrating an oscillation phase in the drilling process according to the present embodiment. FIG. 7 is a view illustrating an oscillation command in the drilling process according to the present embodiment. FIG. 8 is a view illustrating a superimposed command in the drilling process according to the present embodiment.

Firstly, when an oscillation phase and a phase of rotation of the main axis are not allowed to be synchronized with each other, an oscillation command is calculated with Mathematical Equation (1) described below.

[Mathematical Equation 1]

$$\text{Oscillation command} = (K \times F/2) \times \cos(2\pi \times I \times t) - (K \times F/2) \quad (1)$$

In Mathematical Equation (1) described above, K represents a magnification of an oscillation amplitude with respect to an amount of movement of a tool, F represents the amount of movement of the tool, i.e., an amount of feed per rotation [mm/one rotation of main axis], I represents a rate of change in oscillation phase per unit time, and t represents time [s]. Furthermore, (K×F/2) represents an oscillation amplitude, (2π×I×t) represents an oscillation phase, −(K×F/2) represents offset for preventing excess cutting with respect to a command position during normal cutting with no oscillation.

Note herein that, when a time $t_1$ at which an oscillation phase reaches π and a time $t_2$ at which the oscillation phase reaches 2π are used as threshold values, and when a rate of change in oscillation phase I is changed, a superimposed command as illustrated in FIGS. 5 to 8 is generated. At this time, $I_1$ and $I_2$ may be respectively directly designated from predetermined frequencies. Otherwise $I_1$ may be designated as 1, while $I_2$ may be designated as a magnification that is multiplied to a predetermined frequency.

Firstly, as illustrated in FIG. 5, within a range between $t_1$ and $t_2$, the rate of change in oscillation phase changes and increases from $I_1$ to $I_2$. At this time, as illustrated in FIG. 6, within the range from $t_1$ to $t_2$, it is meant that the rate of change in oscillation phase (frequency) is greater, compared with that over other times. It is thus possible to know that the inclination of the oscillation phase is increased. Furthermore, the oscillation command generated at this time represents a sinusoidal-oscillation command, as illustrated in FIG. 7. Even from this view, it is thus possible to know that, within the range from $t_1$ to $t_2$, the rate of change in oscillation phase (frequency) is increased. A superimposed command acquired by superimposing the oscillation command illustrated in FIG. 7 onto a position command (with no oscillation) then represents such a sinusoidal-superimposed command as illustrated in FIG. 8. As described above, the superimposed command is generated.

Figure 9:
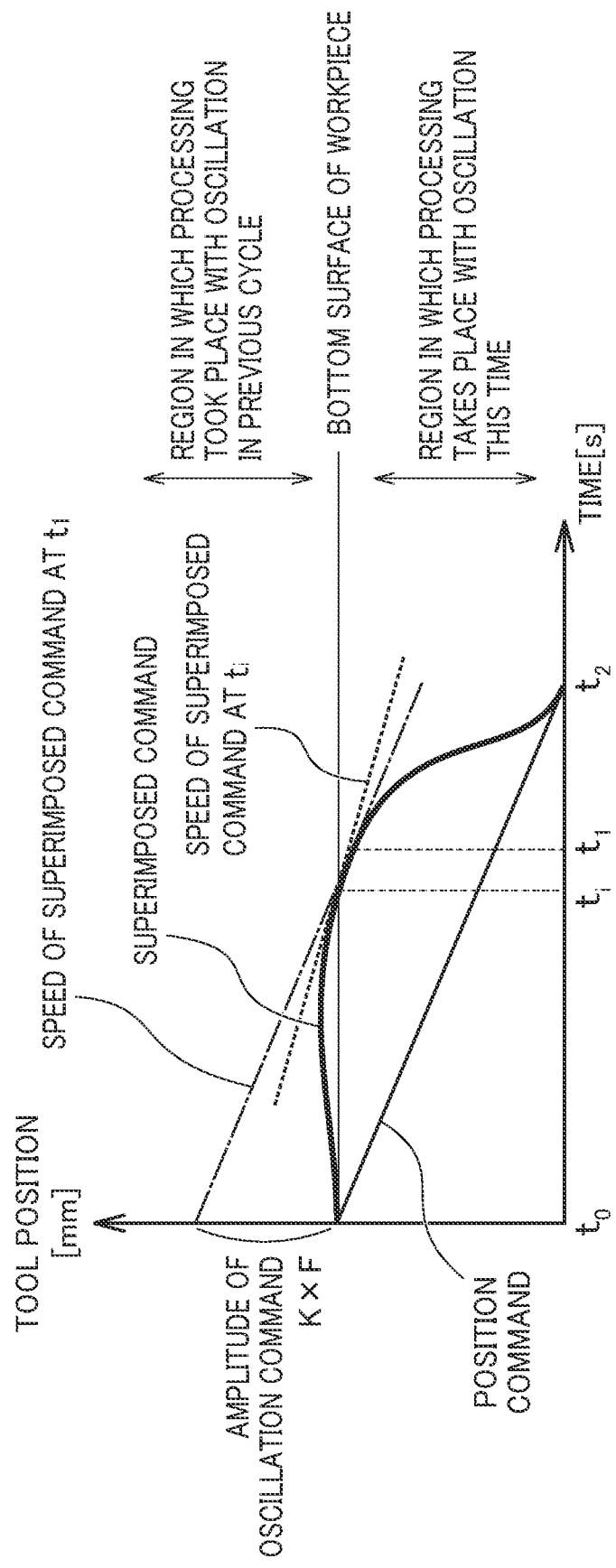

Next, a method of reducing shock during cutting-in in the drilling process according to the present embodiment will now be described herein in detail with reference to FIGS. 9 and 10. Note herein that FIG. 9 is a view illustrating a superimposed command making it possible to reduce shock during cutting-in. Furthermore, FIG. 10 is a view illustrating a superimposed command making it impossible to reduce shock during cutting-in.

Figure 10:
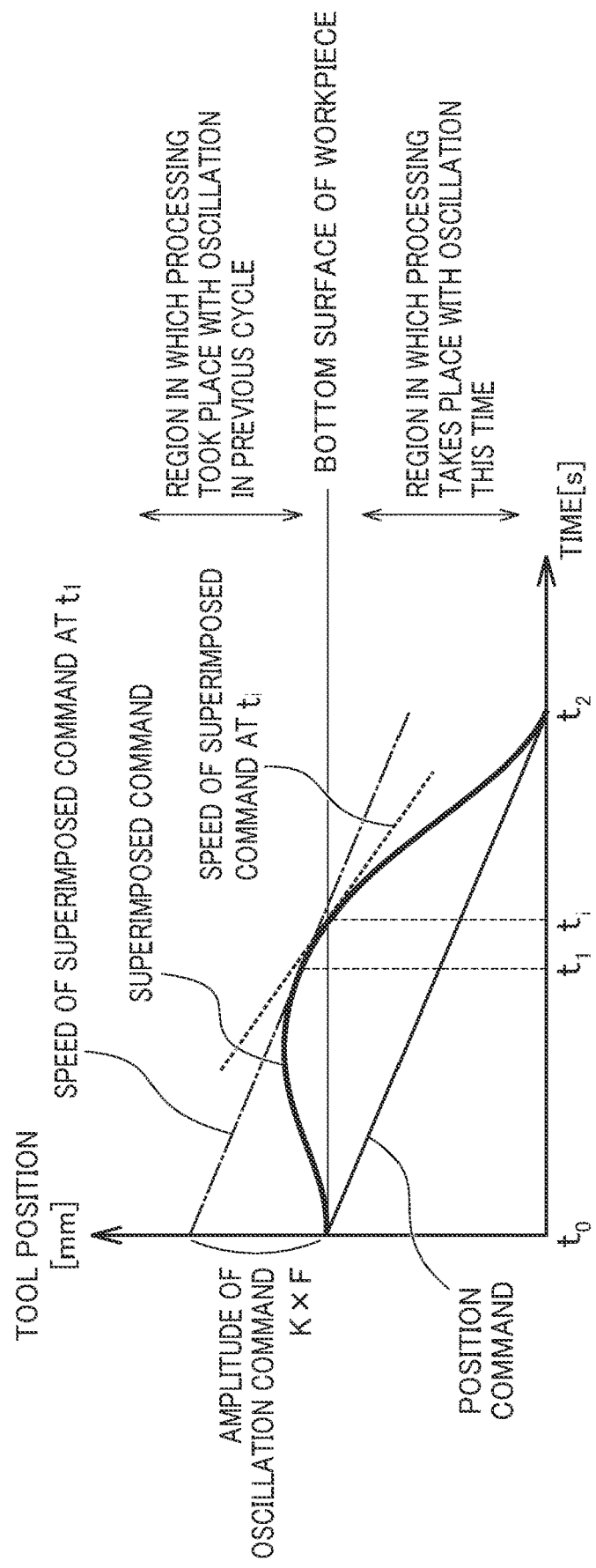

FIGS. 9 and 10 each illustrate one cycle of oscillation. Furthermore, in FIGS. 9 and 10, $t_0$ represents a time when oscillation phase=0 (I×$t_0$=0), $t_1$ represents a time when oscillation phase=π (I×$t_1$=0.5), $t_2$ represents a time when oscillation phase=2π (I×$t_2$=1), and $t_i$ represents a time at a moment when the tool T comes into contact with the workpiece W.

FIG. 9 illustrates the superimposed command when a condition for reducing shock is set based on a speed. At $t_1$ where the oscillation phase becomes π, a speed of a superimposed command is identical to that of a position command (that contains no oscillation command). The speed is illustrated, in FIG. 9, by an inclination of a curve of the superimposed command at $t_1$. By representing it as a mathematical equation, when the oscillation phase becomes π, the term including sin becomes 0 in Mathematical Equation (5) described below, which represents a mathematical equation of a speed of a superimposed command. As illustrated in Mathematical Equation (3) described below, the speed at this time becomes identical to the speed for normal cutting. Furthermore, when I is changed to satisfy 0<I×$t_i$<0.5 at the moment $t_i$ when the tool T comes into contact with the bottom surface of the workpiece, the inclination of the superimposed command becomes smaller than the inclination at $t_1$. It is thus possible to know that it is possible to reduce shock at the moment of contact compared to that for normal cutting where there is no oscillation. On the other hand, it is possible to know, from FIG. 10, that, when I is changed to not satisfy 0<I×$t_i$<0.5, the speed at the moment of contact becomes greater than that for normal cutting. In this case, it is possible to say that shock reduction effects are not fully exerted.

Therefore, when an inclination of a superimposed command is equal to or less than the inclination during normal cutting at the moment when the tool T comes into contact with the bottom surface of the workpiece, it is possible to reduce shock, compared with that during conventional, normal step processing, for example. It is therefore possible to say that it is possible to extend the tool life. Note that, to further improve the tool life, it is desirable to adjust an oscillation amplitude to allow the symbol of an inclination of a superimposed command to invert halfway. That is, it is desirable to allow the tool T to once move away from the bottom surface of the workpiece, and to allow coolant to be supplied to the bottom surface. Thereby, it is possible to expect prevention of fused chips due to friction heat and cutting heat and improvement in the quality of a processing surface and in the tool life.

Next, a method of reducing shock by using acceleration and jerk will now be described herein. For normal cutting with no oscillation, a command position is represented by Mathematical Equation (2) described below, using a main axis rotation number S per minute. A speed is represented by Mathematical Equation (3) described below.

[Mathematical Equation 2]

Command position=$F$[mm/one rotation of main axis]×$S$[one rotation of main axis/minute]×$t$ [second]/60 (2)

Command speed=$F×S/60$ (3)

On the other hand, when an oscillation command is superimposed, a command position of the superimposed command is represented by Mathematical Equation (4) described below. A speed, an acceleration, and a jerk are respectively represented by Mathematical Equations (5), (6), (7) described below.

[Mathematical Equation 3]

Command position=$F×S×t/60+(K×F/2)×\cos(2π×I×t)−(K×F/2)$ (4)

Command speed=$F×S/60−(π×I×K×F)×\sin(2π×I×t)$ (5)

Command acceleration=$−2π^2×I^2×K×F×\cos(2π×I×t)$ (6)

Command jerk=$4π^3×I^3×K×F×\sin(2π×I×t)$ (7)

As described above, when an inclination of a superimposed command is equal to or less than an inclination during normal cutting, i.e., F×S/60 [mm/second], it is possible to reduce shock during cutting-in. Therefore, to set a condition for reducing shock based on a speed at the moment when the tool T comes into contact with the bottom surface of the workpiece, it is enough to satisfy F×S/60>F×S/60−(π×I×K×F)×sin (2π×I×t). Since, when 0<I×t<0.5, the term including sin is represented as a negative value, a speed lower than that during normal cutting is attained.

Since the machine tool control device 100 is able to determine a region of completed processing from position feedback regarding the motor 30, and a method of advancing an oscillation phase is already known, it is possible to acquire a time when the tool T operating in accordance with the superimposed command comes into contact with the workpiece W. Therefore, changing I to satisfy the inequality expression described above at that time makes it possible to reduce shock.

Furthermore, by changing values of I and K to allow the acceleration $-2\pi^2 \times I^2 \times K \times F \times \cos(2\pi \times I \times t)$ described above to be minimum within a time region where the tool T cuts into the workpiece W to suppress acceleration of the tool T during processing, a condition for reducing shock may be set.

Furthermore, by setting values of I and K to allow the jerk $4\pi^3 \times I^3 \times K \times F \times \sin(2\pi \times I \times t)$ to be minimum during whole oscillation, shock that the whole machine receives due to oscillation of a driving part for the feed axis including the tool T may be reduced.

Figure 11:
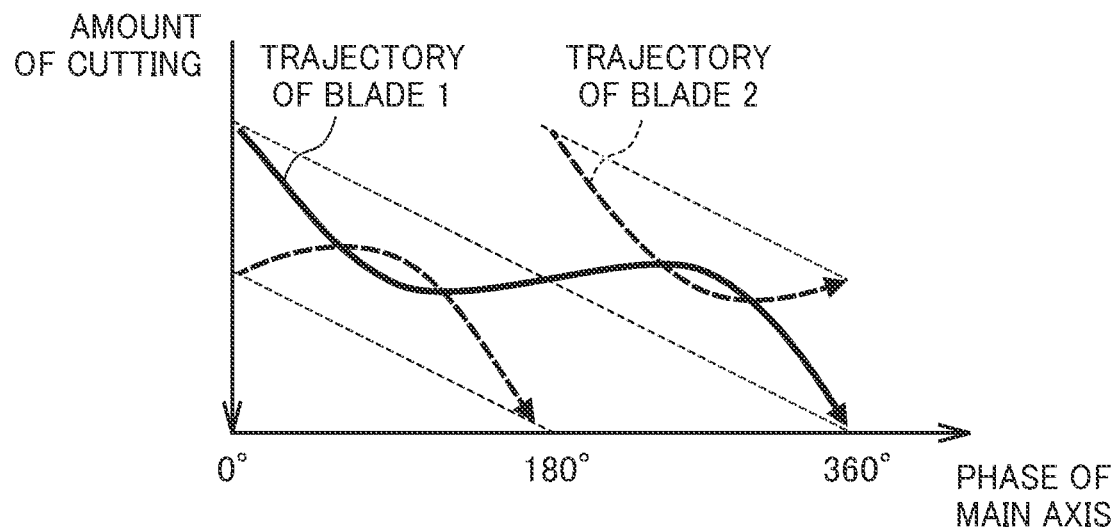
FIG. 11 is a view illustrating trajectories of blades when the number of blades of a tool is two.
Figure 12:
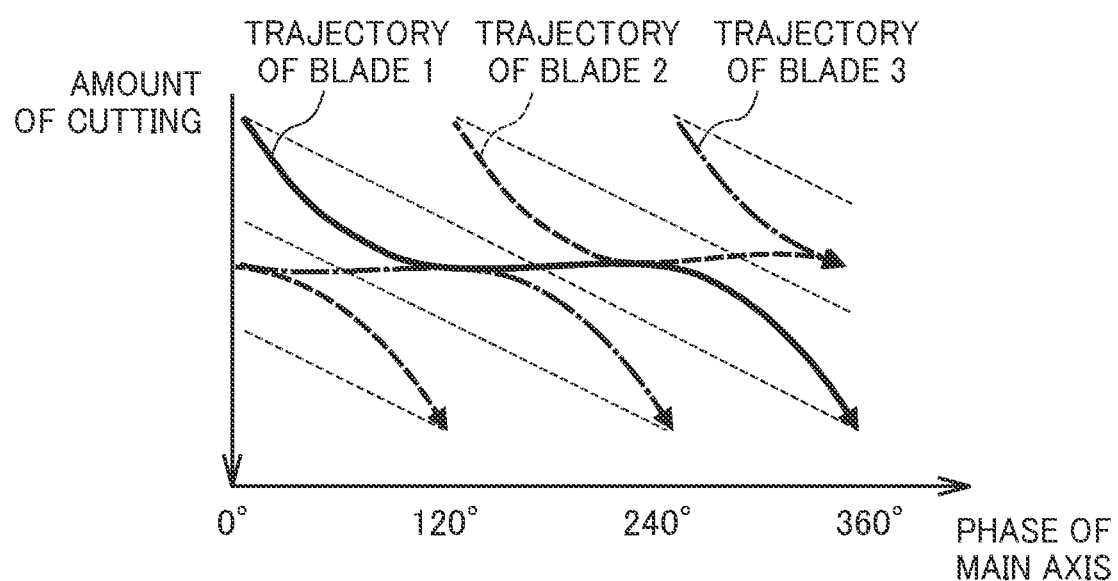
FIG. 12 is a view illustrating trajectories of blades when the number of blades of a tool is three.

Next, synchronization of an oscillation phase and a phase of rotation of the main axis will now be described herein with reference to FIGS. 11 and 12. Note herein that FIG. 11 is a view illustrating trajectories of blades when the number of blades of the tool T is two. Furthermore, FIG. 12 is a view illustrating trajectories of blades when the number of blades of the tool T is three.

Firstly, to allow an oscillation phase to be synchronized with rotation of the main axis, an oscillation command is represented by Mathematical Equation (8) described below.

[Mathematical Equation 4]

$$\text{Oscillation command} = (K \times F/2) \times \cos(2\pi \times S \times I' \times t/60) - (K \times F/2) \quad (8)$$

In Mathematical Equation (8) described above, S represents a rotation speed of the main axis [minute$^{-1}$] or [rpm], and I' represents a rate of change in oscillation phase per one rotation of the main axis. F, K, and t are identical to those used in Mathematical Equation (1) described above. Even when allowing the oscillation phase to be synchronized with the phase of rotation of the main axis, it is possible to calculate a superimposed command, similar to when allowing an oscillation phase to be not synchronized with a phase of rotation of the main axis, as described above.

As is apparent from FIGS. 11 and 12, the greater the number of blades of the tool T, the greater the number of points at which trajectories of the blades of the tool T overlap with each other. Non-actual cutting (air cutting) may thus easily occur, easily breaking up chips. For example, when the number of blades is one, oscillation at a frequency that is a non-integral multiple per rotation of the main axis is preferable. On the other hand, as the number of blades increases, mere synchronization with one rotation of the main axis makes it possible to efficiently break up chips into constant sizes. For example, it is possible to achieve similar effects even with one oscillation per a plurality of rotations.

Furthermore, as is apparent by comparing FIGS. 11 and 12 with each other, the greater the number of blades of the tool T, the smaller the oscillation amplitude at which it is possible to break up chips. The smaller the oscillation amplitude, the greater the advantages in terms of power consumption. Furthermore, although the tool T having many blades offers higher cutting efficiency, a narrower gap between the blades may sacrifice ease of discharging chips. However, an oscillation phase synchronized with a phase of the main axis makes it possible to reliably break up chips, solving this issue. In this case, it is possible to say that it is advantageous in terms of processing efficiency.

Figure 13:
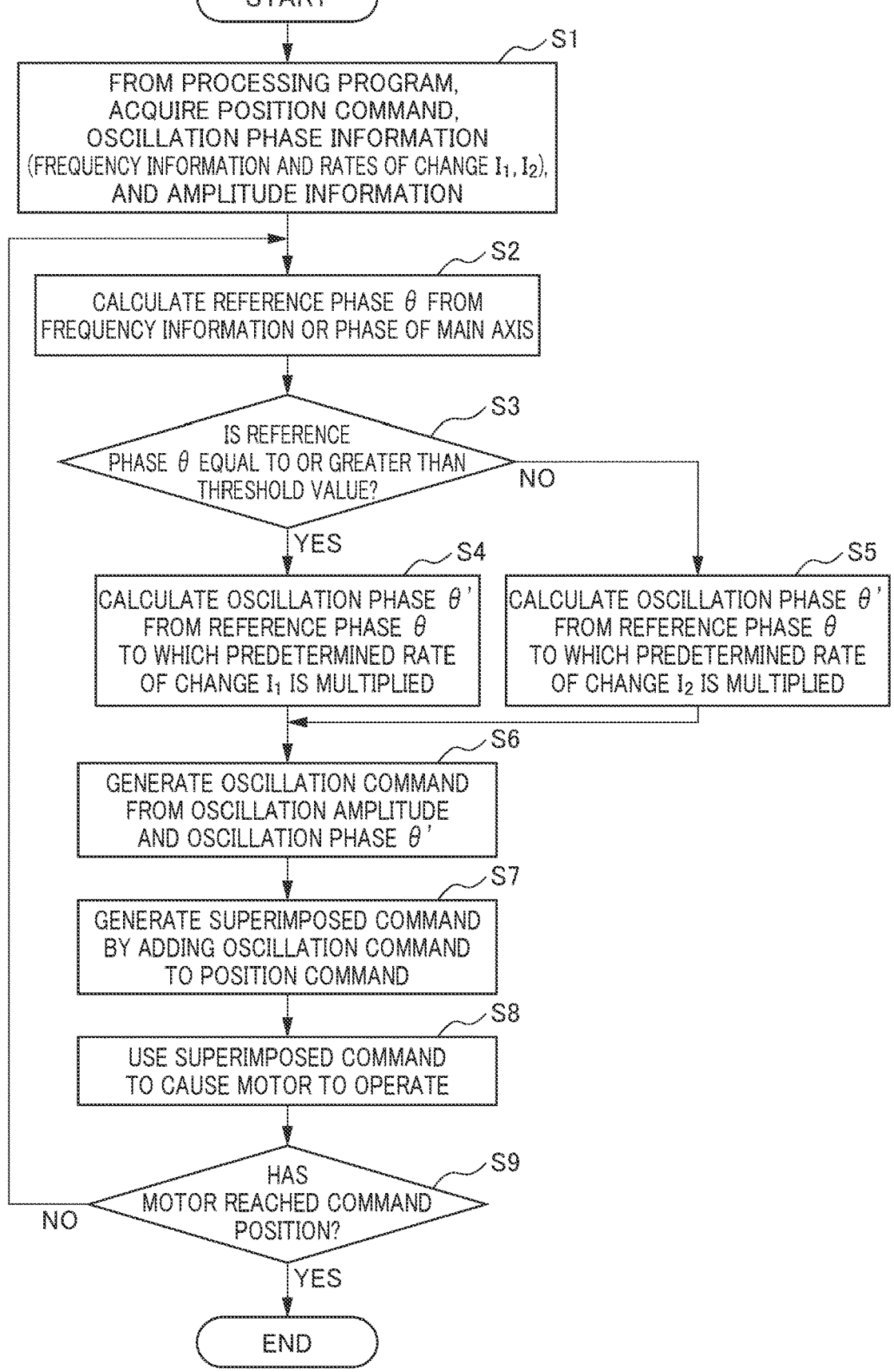
FIG. 13 is a flowchart illustrating steps of the drilling process according to the embodiment of the present disclosure.

Next, steps of the drilling process executed by the machine tool control device 100 according to the present embodiment will now be described herein with reference to FIG. 13. Note herein that FIG. 13 is a flowchart illustrating the steps of the drilling process according to the present embodiment when a method of advancing an oscillation phase is changed based on a reference phase.

Firstly, at Step S1, a position command, oscillation phase information including frequency information and the rates of change $I_1$, $I_2$, and oscillation amplitude information are acquired from a processing program. Next, at Step S2, a reference phase $\theta$ is calculated and updated from the acquired frequency information. Note that, instead of the frequency information, the reference phase $\theta$ may be calculated to achieve synchronization with a phase of the main axis.

Next, at Step S3, it is determined whether the calculated reference phase $\theta$ is equal to or greater than a predetermined threshold value. When this determination corresponds to YES, an oscillation phase $\theta'$ is calculated (updated) from the reference phase $\theta$ to which the rate of change $I_1$ is multiplied at Step S4. Furthermore, when this determination corresponds to NO, the oscillation phase $\theta'$ is calculated (updated) from the reference phase $\theta$ to which the rate of change $I_2$ is multiplied at Step S5.

At Step S6, an oscillation command is generated based on the oscillation phase $\theta'$ and the oscillation amplitude. At Step S7, the oscillation command is added (superimposed) to the position command to generate a superimposed command. The methods of generating the oscillation command and the superimposed command are as described above.

At Step S8, the motor 30 driving the feed axis in accordance with the superimposed command generated at Step S7 is operated. At Step S9, it is determined whether the position of the motor 30 has reached the command position. When this determination corresponds to NO, the process returns to Step S2 for re-execution. When this determination corresponds to YES, the process ends.

According to the present embodiment, it is possible to achieve effects described below.

(1) In the present embodiment, the oscillation command generating unit 16 configured to generate an oscillation command causing the tool T to oscillate with respect to the feed direction relative to the workpiece W, based on a predetermined oscillation condition, is provided. It is then configured to change at least one selected from a method of advancing a phase of an oscillation command and an amplitude of the oscillation command, based on an oscillation phase calculated based on a predetermined oscillation condition, or time. According to the present embodiment, it is possible to change a method of advancing a phase, i.e., to change a frequency and an amplitude, between a forward action and a backward action within one cycle of an oscillation operation. Thereby, it is possible to reliably break up and discharge chips, and it is possible to suppress damage to the tool by reducing shock when the tool T cuts into the workpiece W. Specifically, for example, it is possible to superimpose a sinusoidal-oscillation command onto a command for cutting feed at a constant speed, and, within an interval from when the tool T moves backward in accordance with the superimposed command to when the tool T comes into contact again with the workpiece W, it is possible to reduce how much the phase advances by multiplying a rate of change in oscillation phase per time with a predetermined magnification. Otherwise, it is possible to designate first frequency information and second frequency information through a processing program, and to switch the information within the interval described above to reduce how much the phase advances. Thereby, it is possible to reliably reduce shock during cutting-in. Furthermore, in the present embodiment, it is possible to change only a frequency of oscillation (a method of advancing a phase), and to keep a feed rate of a position command as is, making it possible to achieve operation for a cycle time identical to the cycle time when there is no oscillation. Furthermore, a backward action through an oscillation operation makes it possible to move the tool T away from the bottom surface of the workpiece, making it possible to suppress wear of the tool tip and an increase in temperature at a processing point.

(2) In the present embodiment, the storage unit 22 configured to store tool information regarding the tool T is provided and is configured to change at least one selected from a method of advancing a phase of an oscillation command and an amplitude of the oscillation command based on the tool information. According to the present embodiment, at a timing of exchanging the tool T, for example, it is possible to change a method of advancing a phase of an oscillation command and an amplitude of the oscillation command for a whole phase, instead of one cycle, in accordance with tool information regarding the tool constant, including the number of blades of the tool T and a tool diameter. Therefore, it is possible to generate a more optimum oscillation command, making it possible to suppress wear of tool due to excessive oscillation. For example, when a ratio of a processing depth with respect to a tool diameter is equal to or greater than a predetermined value, increasing an oscillation phase (frequency) makes it possible to improve ease of discharging chips. Furthermore, for example, the greater the number of blades of the tool T, the easier it is for the trajectories of blades to overlap with each other, making it possible to easily achieve non-actual cutting (air cutting). Even by increasing an oscillation phase (frequency) and reducing an oscillation amplitude, it is therefore possible to break up chips.

(3) In the present embodiment, the load acquiring unit configured to acquire a load exerted on the tool T during a cutting process is provided. It is thus configured to allow the oscillation phase calculating unit 163 to change a method of advancing the oscillation phase calculated based on the predetermined oscillation condition to reduce the load or to allow the oscillation amplitude calculating unit 161 to change the oscillation amplitude calculated based on the predetermined oscillation condition to reduce the load. Thereby, since it is possible to change a method of advancing an oscillation phase, and to change an oscillation amplitude, under which there is a greater shock during cutting-in, it is possible to reliably suppress damage to the tool even when an excessive cutting load is exerted. For example, by determining that, when a load exceeds a predetermined threshold value, the tool T has bitten chips, and by changing an oscillation phase and an oscillation amplitude to extend the time for non-actual cutting (air cutting), it is possible to further reliably reduce shock, making it possible to further suppress damage to the tool T.

(4) In the present embodiment, the learning control unit 14 configured to compensate the superimposed command by calculating an amount of compensation for the superimposed command based on a position error and adding the calculated amount of compensation to the superimposed command is provided. Thereby, for example, even under oscillation at a higher frequency, the motor 30 is able to accurately follow a superimposed command, making it possible to efficiently break up chips. Furthermore, even when there is a greater cutting load or it is impossible to follow a superimposed command due to a greater back action of the feed axis being oscillated, it is possible to accurately follow the superimposed command, making it possible to efficiently break up chips.

(5) In the present embodiment, it is configured to cause a phase of an oscillation command to be synchronized with a phase of the main axis causing the tool T to rotate relative to the workpiece W. Thereby, it is possible to more efficiently break up chips, making it possible to follow high speed oscillation.

Note that the present invention is not limited to the embodiment described above. The present invention still includes amendments and modifications, for example, that fall within the scope of the present invention, as long as it is possible to achieve the object of the present invention. For example, although, in the embodiment described above, the present invention has been applied to a hole-cutting process using a drill as a cutting tool, the present invention is not limited to the embodiment. For example, the present invention is also applicable to other cutting processes such as turning processes and threading processes.

EXPLANATION OF REFERENCE NUMERALS

10 Servo controller
11, 13 Adder
12 Integrator
14 Learning control unit
15 Position and speed control unit (control unit)
16 Oscillation command generating unit
17 Load acquiring unit
21 Position command calculating unit
22 Storage unit
30 Motor (electric motor)
100 Machine tool control device
161 Oscillation amplitude calculating unit
162 Oscillation command calculating unit
163 Oscillation phase calculating unit

The invention claimed is:

1. A machine tool control device configured to execute a cutting process by controlling an electric motor for a main axis configured to cause a cutting tool to rotate relative to a workpiece and controlling an electric motor for a feed axis configured to cause the cutting tool to move and oscillate with respect to a feed direction relative to the workpiece, the machine tool control device comprising:
a memory storing a computer-readable program which, when executed, causes the machine tool control device to control the cutting tool; and
a processor which, when executing the computer-readable program, is configured to function as:
an oscillation command generating unit configured to generate an oscillation command causing the cutting tool to oscillate with respect to the feed direction relative to the workpiece, based on a predetermined oscillation condition;
a control unit configured to control the electric motor for the feed axis, based on a superimposed command generated by superimposing the oscillation command generated by the oscillation command generating unit onto a position command or a position error representing a difference between the position command and position feedback; and
a load acquiring unit configured to acquire a load that is exerted on the cutting tool during the cutting process,
wherein the oscillation command generating unit changes at least one selected from a method of advancing a phase of the oscillation command and an amplitude of the oscillation command, based on either an oscillation phase calculated based on the predetermined oscillation condition, or time, wherein the oscillation command generating unit includes:
- an oscillation phase calculating unit configured to calculate an oscillation phase based on the predetermined oscillation condition;
- an oscillation amplitude calculating unit configured to calculate an oscillation amplitude based on the predetermined oscillation condition; and
- an oscillation command calculating unit configured to calculate the oscillation command based on the oscillation phase calculated by the oscillation phase calculating unit and the oscillation amplitude calculated by the oscillation amplitude calculating unit, and the oscillation phase calculating unit changes a method of advancing the oscillation phase calculated based on the predetermined oscillation condition to reduce the load acquired by the load acquiring unit, or the oscillation amplitude calculating unit changes the oscillation amplitude calculated based on the predetermined oscillation condition to reduce the load acquired by the load acquiring unit.

2. The machine tool control device according to claim 1, wherein the memory is configured to store tool information regarding the cutting tool, and the oscillation command generating unit changes at least one selected from the method of advancing the phase of the oscillation command and the amplitude of the oscillation command, based on the tool information.

3. The machine tool control device according to claim 1, wherein the processor which, when executing the computer-readable program, is further configured to function as a learning control unit configured to compensate the superimposed command by calculating an amount of compensation for the superimposed command for making the position error closer to 0 and adding the calculated amount of compensation to the superimposed command, thereby improving ability of the following oscillation command.

4. The machine tool control device according to claim 1, wherein the oscillation command generating unit causes the phase of the oscillation command to be synchronized with a phase of the main axis causing the cutting tool to rotate relative to the workpiece.

* * * * *